(12) United States Patent
Tripathi et al.

(10) Patent No.: US 11,943,229 B2
(45) Date of Patent: Mar. 26, 2024

(54) SYSTEM AND METHOD OF MANAGING ACCESS TO REMOTE DIGITAL PLATFORMS

(71) Applicant: Innoplexus AG, Eschborn (DE)

(72) Inventors: Gaurav Tripathi, Pune (IN); Suyash Masugade, Satara (IN)

(73) Assignee: INNOPLEXUS AG, Eschborn (DE)

( * ) Notice: Subject to any disclaimer, the term of this patent is extended or adjusted under 35 U.S.C. 154(b) by 414 days.

(21) Appl. No.: 16/369,495

(22) Filed: Mar. 29, 2019

(65) Prior Publication Data
US 2020/0314106 A1    Oct. 1, 2020

(51) Int. Cl.
| | | |
|---|---|---|
| H04L 29/06 | (2006.01) | |
| G06F 21/62 | (2013.01) | |
| H04L 9/30 | (2006.01) | |
| H04L 9/40 | (2022.01) | |

(52) U.S. Cl.
CPC ........ H04L 63/105 (2013.01); G06F 21/6218 (2013.01); H04L 9/30 (2013.01)

(58) Field of Classification Search
CPC ..... H04L 63/105; H04L 9/30; H04L 21/6218; H04L 9/0894; H04L 63/0815; G06F 21/6218; G06F 21/41
See application file for complete search history.

(56) References Cited

U.S. PATENT DOCUMENTS

| | | | | |
|---|---|---|---|---|
| 10,433,195 | B2* | 10/2019 | Khurana | ........... H04W 52/0254 |
| 2007/0171921 | A1* | 7/2007 | Wookey | ................ G06F 9/5027 |
| | | | | 370/401 |
| 2019/0334874 | A1* | 10/2019 | Frost | ..................... H04L 63/123 |
| 2020/0178050 | A1* | 6/2020 | DeLuca | ................ H04W 76/14 |
| 2020/0358856 | A1* | 11/2020 | Guerra | ................ H04L 63/0853 |

* cited by examiner

*Primary Examiner* — Joseph P Hirl
*Assistant Examiner* — Leynna Truvan
(74) *Attorney, Agent, or Firm* — Innoplexus AG; Frank E. Levine

(57) ABSTRACT

Disclosed is a system for managing access to a plurality of remote digital platforms, wherein the system comprising a plurality of platform databases, wherein a given platform database is associated with a given remote digital platform and stores metadata related thereto, the system further comprising: a user device, wherein an existing user generates a user-request, and provides a remote digital platform identifier; an access-control database comprising information relating to roles and permissions associated with a plurality of users; a key-store database comprising private key associated with the plurality of users; and a server arrangement, the server arrangement: identifies a given remote digital platform server; obtains credentials from the existing user and verifies the credentials; determines roles and permissions associated with the existing user; retrieves a private key; verifies the private key with a public key stored at the given remote digital platform server; and enables a data communication network.

14 Claims, 5 Drawing Sheets

SYSTEM AND METHOD OF MANAGING ACCESS TO REMOTE DIGITAL PLATFORMS

TECHNICAL FIELD

The present disclosure relates generally to information technology; and more specifically, to systems and methods of managing access to a plurality of remote digital platforms.

BACKGROUND

In past few decades technological advancement in the field of information and technology has grown exponentially. People have started using online/internet-based services for multiple purposes such as booking movie tickets, ordering goods, solving mathematical problems, storing digital data and so forth. Nowadays, a user tends to create user accounts with multiple online/internet-based platforms in order to avail services provided thereby. However, the user requires to remember credentials for each of the multiple online/internet-based platforms for using the user accounts. Each time the user requires to access a given online/internet-based platform he/she has to provide credential for the given online/internet-based platform.

Presently, existing techniques for managing user accounts with multiple online/internet-based platforms stores credentials for each of the online/internet-based platforms. The existing techniques provide the credentials to the user each time the user requires to use a user account associated with any of the multiple online/internet-based platforms. The existing techniques use an intermediate medium such as a browser for connecting with the online/internet-based platforms. However, the existing techniques for managing user accounts suffer from some performance issues.

The existing techniques require to provide credential to the online/internet-based platforms each time the user tries to connect therewith. Such requirement of providing credentials consumes time and may not work well with slower networks. Furthermore, the existing techniques do not allow the user to connect with multiple online/internet-based platforms at a time which reduces user-friendliness of such existing techniques. In addition, the existing techniques consume a lot of user time as they do not allow connecting with multiple online/internet-based platforms simultaneously. Moreover, inability of the existing techniques to directly connect with the platforms increases response time, access time and reduces throughput thereof. Furthermore, addition and deletion of such online/internet-based platforms as and when required by the user is not supported by the existing techniques.

Therefore, in light of the foregoing discussion, there exists a need to overcome the aforementioned drawbacks associated with the existing techniques for managing user accounts with multiple online/internet-based platforms.

SUMMARY

The present disclosure seeks to provide a system for managing access to a plurality of remote digital platforms. The present disclosure also seeks to provide a method of managing a plurality of remote digital platforms. The present disclosure seeks to provide a solution to the existing problem of unmanageable, and time-consuming approach of accessing the plurality of remote digital platforms. An aim of the present disclosure is to provide a solution that overcomes at least partially the problems encountered in prior art, and provides a solution to manage access to the plurality of remote digital platforms in a secured, seamless and low time-consuming approach.

In one aspect, an embodiment of the present disclosure provides a system for managing access to a plurality of remote digital platforms, wherein the system comprising a plurality of platform databases, wherein a given platform database in the plurality of platform databases is associated with a given remote digital platform and stores metadata related thereto, the system further comprising:
- a user device, wherein an existing user associated with the user device generates a user-request for accessing a given remote digital platform, and provides a remote digital platform identifier for the given remote digital platform;
- an access-control database comprising information relating to roles and permissions associated with a plurality of users;
- a key-store database comprising private key associated with the plurality of users; and
- a server arrangement, wherein the server arrangement:
  - identifies a given remote digital platform server associated with the remote digital platform identifier using the plurality of platform databases;
  - obtains credentials from the existing user via the user device and verifies the credentials;
  - determines roles and permissions associated with the existing user by accessing the access-control database;
  - retrieves a private key associated with the existing user by accessing the key-store database;
  - verifies the private key associated with the existing user with a public key stored at the given remote digital platform server; and
  - enables a data communication network between the given remote digital platform server and the user device.

In another aspect, an embodiment of the present disclosure provides a method of managing access to a plurality of remote digital platforms, using a system comprising a plurality of platform databases, wherein a given platform database in the plurality of platform databases is associated with a given remote digital platform and stores metadata related thereto, wherein the method comprises:
- generating a user-request for accessing a given remote digital platform via a user-device associated with an existing user, and obtaining a remote digital platform identifier for the given remote digital platform via the user-device associated with the existing user;
- identifying a given remote digital platform server associated with the remote digital platform identifier using the plurality of platform databases;
- obtaining credentials from the existing user via the user device and verifying the credentials;
- determining roles and permissions associated with the existing user by accessing an access-control database;
- retrieving a private key associated with the existing user by accessing a key-store database;
- verifying the private key associated with the existing user with a public key stored at the given remote digital platform server; and
- enabling a data communication network between the given remote digital platform server and the user device.

Embodiments of the present disclosure substantially eliminate or at least partially address the aforementioned problems in the prior art, and enable a secured and seamless way of managing access to a plurality of remote digital platforms without having to authenticate users multiple times for each of the plurality of remote digital platforms.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
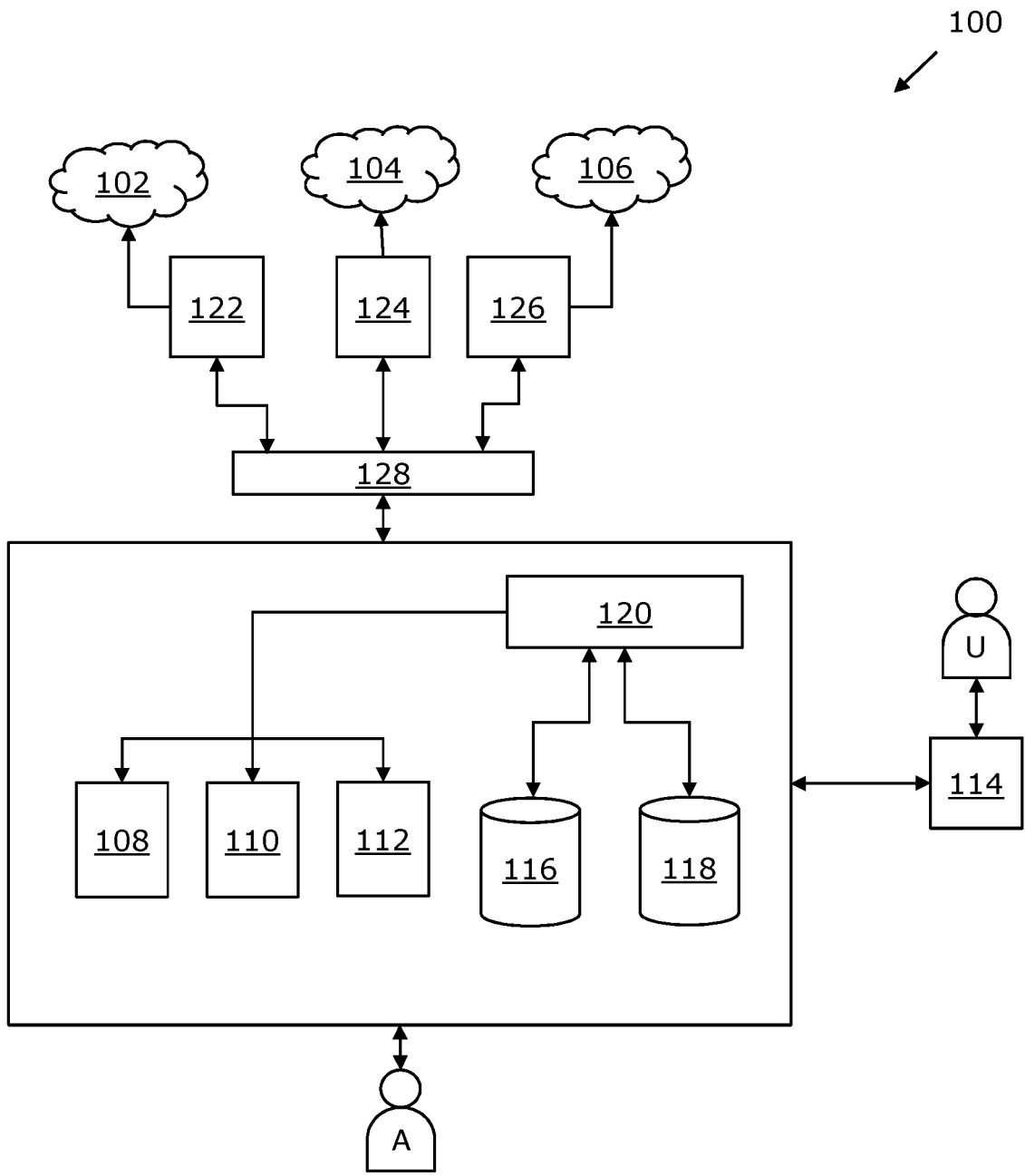
FIG. 1 illustrates a schematic diagram of a system for managing access to a plurality of remote digital platforms, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for managing access to a plurality of remote digital platforms, wherein the system comprising a plurality of platform databases, wherein a given platform database in the plurality of platform databases is associated with a given remote digital platform and stores metadata related thereto, the system further comprising:
  a user device, wherein an existing user associated with the user device generates a user-request for accessing a given remote digital platform, and provides a remote digital platform identifier for the given remote digital platform;
  an access-control database comprising information relating to roles and permissions associated with a plurality of users;
  a key-store database comprising private key associated with the plurality of users; and
  a server arrangement, wherein the server arrangement:
    identifies a given remote digital platform server associated with the remote digital platform identifier using the plurality of platform databases;
    obtains credentials from the existing user via the user device and verifies the credentials;
    determines roles and permissions associated with the existing user by accessing the access-control database;
    retrieves a private key associated with the existing user by accessing the key-store database;
    verifies the private key associated with the existing user with a public key stored at the given remote digital platform server; and
    enables a data communication network between the given remote digital platform server and the user device.

In another aspect, an embodiment of the present disclosure provides a method of managing access to a plurality of remote digital platforms, using a system comprising a plurality of platform databases, wherein a given platform database in the plurality of platform databases is associated with a given remote digital platform and stores metadata related thereto, wherein the method comprises:
  generating a user-request for accessing a given remote digital platform via a user-device associated with an existing user, and obtaining a remote digital platform identifier for the given remote digital platform via the user-device associated with the existing user;
  identifying a given remote digital platform server associated with the remote digital platform identifier using the plurality of platform databases;
  obtaining credentials from the existing user via the user device and verifying the credentials;
  determining roles and permissions associated with the existing user by accessing an access-control database;
  retrieving a private key associated with the existing user by accessing a key-store database;
  verifying the private key associated with the existing user with a public key stored at the given remote digital platform server; and
  enabling a data communication network between the given remote digital platform server and the user device.

The present disclosure provides an efficient approach for managing access to a plurality of remote digital platforms. Furthermore, the system disclosed herein applies authentication and verification at multiple levels and ensures a secured access to the plurality of remote digital platforms. Moreover, the invention disclosed herein substantially reduces user effort in memorizing multiple passwords for each of the plurality of remote digital platforms. In addition, the invention disclosed herein works in an efficient manner by predetermining a bandwidth requirement of the plurality of user so that network bandwidth is allocated and utilized effectively among the plurality of users. Moreover, the invention disclosed herein is compatible with existing hardware and software infrastructure and has a low time and processing complexity. Therefore, management of access to the plurality of digital platforms is achieved in a cost-efficient manner.

In recent years, using multiple digital platforms for different purposes such as ordering food, storing pictures and the like has become an indispensable part of people's everyday lives. Notably, people need to have credentials for each of the multiple digital platforms in order to using them. However, remembering credentials for each of the digital platforms becomes bothersome and difficult. Therefore, a solution for eliminating the need for remembering credentials for each of the multiple digital platforms.

Disclosed herein is the system for managing access to the plurality of remote digital platforms. The system manages accessing the plurality of remote digital platforms by eliminating the need of remembering different credentials for each of the plurality of digital platforms, wherein the plurality of remote digital platforms relate to cloud/internet based applications that provide services such as online tools (storage, processing and so forth), services (ordering food, cloths, chatting and so forth), platforms and the like. Furthermore, the plurality of digital platforms require credential (such as passwords, security pin, security question digital signature and the like) to allow access to services provided thereby. In addition, the plurality of digital platforms may charge an enumeration (such as digital money, tokens, fiat money and the like) in lieu of services provided thereby. Alternatively, the plurality of digital platforms may provide services to users without charging any enumeration. Moreover, the plurality of digital platforms are accessed using the user device (such as a smart phone, a laptop, a tablet, a phablet and so forth).

Furthermore, the system comprises the plurality of platform databases, wherein the given platform database in the plurality of platform databases is associated with the given remote digital platform and stores metadata related thereto. The plurality of platform databases include data associated with the plurality of remote digital platforms. Furthermore, the plurality of platform databases are an organized body of digital information regardless of the manner in which the data or the organized body thereof is represented. Optionally, the plurality of platform databases may be hardware, software, firmware and/or any combination thereof. For example, the organized body of data related to the plurality of digital platforms may be in the form of a table, a map, a grid, a packet, a datagram, a file, a document, a list or in any other form. The plurality of platform databases include any data storage software and systems, such as, for example, a relational database like IBM DB2 and Oracle 9. Furthermore, the plurality of platform databases refers to the software program for creating and managing one or more databases related to data associated with the plurality of remote digital platforms. Optionally, the plurality of platform databases may be operable to supports relational operations, regardless of whether it enforces strict adherence to the relational model, as understood by those of ordinary skill in the art. Additionally, the plurality of platform databases are populated by data elements. Furthermore, the data elements may include data records, bits of data, cells, are used interchangeably herein and all intended to mean information stored in cells of a database. The data elements stored in the plurality of platform databases are metadata related to the plurality of remote digital platforms, wherein each of the plurality of platform databases include data related to one of the plurality of remote digital platforms. Furthermore, metadata related to the given remote digital platform may include a domain name server name, an IP address, a Uniform Resource Locator (URL) and so forth.

As mentioned previously, the system further comprises the access-control database comprising information relating to roles and permissions associated with the plurality of users. The access-control database has a similar organization and architecture as elaborated earlier with respect to the plurality of platform databases. Furthermore, the access-control database includes information associated with the plurality of users of the system, wherein each of the plurality of users is an existing user of the system. The data stored in the access-control database includes information related with roles and permissions of each of the plurality of users, wherein permissions related to the plurality of users refer to: permission to read contents of different databases within the system, permission to write in different databases within the system, permission to modify the content of the in different databases within the system, permission to delete from content of the different databases within the system and so forth. Moreover, roles of the plurality of users relate to a stature assigned to the plurality of users. Notably, a specific role of each of the plurality of users allow them to make certain changes in the system.

Optionally, roles associated with the plurality of users is any one of: an administrator, a standard user, a privileged user. The administrator is any of the plurality of users having administrative rights in the system. In addition, the administrator is a first user of the system and manages the system. Moreover, any of the plurality of users is the standard user, wherein the standard user gets his/her rights and permissions from the administrator. The standard user possesses the right to access the given remote digital platform. In addition, the standard user possesses the right to transfer files to and from the remote digital platform. Moreover, the privileged user has all the rights of the standard user along with certain additional rights given by the administrator. Such additional rights include getting access to the given remote digital platform in an instance of conflict.

Optionally, the administrator: adds users to the system, provides permissions to the users, delete users from the system, adds remote digital platforms to the system. The administrator manages the system by adding new users to the system, assigning the new users respective roles thereof, providing the new users permissions to read, write, modify and make changes within the system, removing existing users from the system, deleting data related to the removed users. Moreover, the administrator further makes changes in the plurality of platform databases by adding and removing the plurality of remote digital platforms and metadata related thereto from the plurality of platform databases. More optionally, the system has more than one administrator.

Moreover, the system further comprises the user device, wherein the user device relates to hardware and software-based devices having a user interface that is used to interact with the user device and provide instructions thereto. Furthermore, the user device may be programmable or non-programmable. In addition, the user device has hardware and software components to communicate with other user devices, servers, communicating nodes and the like. Furthermore, the user device is configured to connect to the plurality of remote digital platforms. Examples of user device includes computer, laptop, smart phone, table, phablet and so forth. Furthermore, the existing user associated with the user device generates the user-request for accessing the given remote digital platform, and provides the remote digital platform identifier for the given remote digital platform. The existing user is a user (namely, a person, an organization and the like) who has previously registered with the plurality of remote digital platform and has previously used the system to access the plurality of remote digital platforms. The plurality of platform database has metadata associated with the plurality of remote digital platforms related to the existing user. The plurality of remote digital platforms related to the user are digital platforms that the existing user has used previously. The existing user uses the user interface of the user device to generate the user-request for accessing the given remote digital platform. Notably, the given remote digital platform is any one of the plurality of remote digital platforms. It will be appreciated that the given remote digital platform is a remote digital platform that the existing user wants to access. In an example, the user-request may be generated by way of a command. In another example, the user-request may be generated by way of a keyboard input. Moreover, the existing user provides the system the remote digital identifier for the given remote digital platform. The remote digital identifier for the given remote digital platform is IP address, Uniform Resource Locator (URL), a domain name and so forth associated with the given remote digital platform.

Optionally, the user-request is: an access request, a file transfer request. The existing user generates a request to connect to the given remote digital platform. The request to connect to the remote digital platform is either access request or file transfer request. The existing user that generates access request gets communicably coupled to the given remote digital platform via a communication channel allowing access of data that is reading content of the remote digital platform. In an exemplary embodiment the communication channel for access request is implemented via Secure shell tunneling protocol (SSH) (namely, SSH port forwarding). Notably, SSH tunneling is a method of transporting arbitrary networking data over an encrypted SSH connection. It is used to add encryption to data communication. It is also be used to implement VPNs (Virtual Private Networks) and access intranet services across different networks and firewalls. Moreover, the existing user that generates file transfer request gets communicably coupled to the given remote digital platform via a communication channel allowing transfer of files to and from the remote digital platform. In an exemplary embodiment, the file transfer request of the existing user is implemented via Secure File Transfer Protocol (sFTP). Notably, the sFTP runs over the SSH tunneling protocol. It supports full security and authentication functionality of SSH tunneling protocol. Beneficially, defining a type of user-request helps the system in determining a network bandwidth requirement of the existing user. Notably, the access request requires a lower bandwidth as compared to the file transfer request.

As mentioned previously the system further comprises the server arrangement, wherein the server arrangement relates to a structure and/or module that include programmable and/or non-programmable components configured to store, process and/or share information. Optionally, the server arrangement includes any arrangement of physical or virtual computational entities capable of enhancing information to perform various computational tasks. Furthermore, it should be appreciated that the server arrangement may be both single hardware server and/or plurality of hardware servers operating in a parallel or distributed architecture. In an example, the server arrangement may include components such as memory, a processor, a network adapter and the like, to store, process and/or share information with other computing components, such as user device/user equipment. Optionally, the server arrangement is implemented as a computer program that provides various services (such as database service) to other devices, modules or apparatus.

Moreover, the user-request generated by the existing user is communicated to the server arrangement, wherein the server arrangement, in operation, processes the user-request. The server arrangement identifies the given remote digital platform server associated with the remote digital platform identifier using the plurality of platform databases. The server arrangement receives the user-request including the remote digital platform identifier having at least one of: an IP address, a Uniform Resource Locator (URL), a domain name and the like associated with the given remote digital platform. Subsequently, the server arrangement matches the remote digital platform identifier with the metadata associated with the plurality of remote digital platforms stored in the plurality of platform databases. The server arrangement identifies one of the plurality of platform databases that contains metadata matching with the remote digital platform identifier provided by the existing user. The platform database identified by the server arrangement has one or more remote digital platform servers associated therewith. The server arrangement identifies one of the remote digital platform servers that is available as the given remote digital platform server. Notably, remote digital platform servers among the one or more digital platform server associated with the identified remote digital platform may be in use by other existing users of the system.

Optionally, the administrator adds remote digital platform server to the system, delete remote digital platform server from the system. The administrator grants access to standard user and privileged user and makes changes in the system to add a new remote digital platform server of any of the plurality of remote digital platforms or to add a remote digital platform server of a new remote digital platform. Moreover, the administrator removes data associated with a non-working remote digital platform server or a remote digital platform server of a remote digital platform that is no longer a part of the system. The administrator works as an access controller within the system.

Optionally, the administrator accesses the system as the standard user or the privileged user. Moreover, the administrator works in three ways within the system namely, grant access, work as the standard user to access the given remote digital platform, maintain the plurality of platform databases. The administrator maintains the plurality of platform databases by adding and removing the plurality of remote digital platforms and creating and deleting remote digital platform servers. The administrator is configured to communicate with the remote digital platforms using command line interface for maintain the plurality of platform databases.

Moreover, the server arrangement obtains credentials from the existing user via the user device and verifies the credentials. The server arrangement directs the existing user via the user device to provide credentials for using the system to access the plurality of remote digital platforms. In other words, the server arrangement directs the existing user to provide credentials for accessing the given remote digital platform. Furthermore, the credentials provided by the existing user is a password, answer for a security question, an OTP (one-time password), a thumb impression, an optical password, a scanned input or any other way of establishing authentication.

Optionally, the server arrangement verifies the credentials provided by the existing user using two factor authentication (2FA). Notably, two factor authentication (namely, two-step verification or dual factor authentication) is a security process in which the existing user provides two different authentication factors to verify himself/herself to protect the credentials as well as the system and the given remote digital platform. Furthermore, Two-factor authentication method rely on the existing user providing a password as well as a second factor, such as a security token or a biometric factor like a fingerprint or facial scan. The server arrangement works as an authorizer to allow the existing user to access the given remote digital platform.

Furthermore, the server arrangement determines roles and permissions associated with the existing user by accessing the access-control database. The server arrangement, after verifying authentication of the existing user accesses the access-control database for determining a role and permissions associated therewith. Notably, the server arrangement determines roles and permission associated with the existing user to ascertain if the user-request generated by the existing user can be granted. In an example, a standard user may not be allowed to add a new user to the system.

Moreover, the system further comprises the key-store database comprising private key associated with the plurality of users. Furthermore, the server arrangement retrieves the private key associated with the existing user by accessing the key-store database. Notably, the system applies asymmetric encryption technique for establishing communication between the user device and the remote digital platform server, wherein the private associated with the existing user is stored in key-store database. Notably, the key-store database includes private keys associated with the plurality of users of the system.

Optionally, the key-store database is not accessible to the plurality of users of the system. Alternatively, optionally, a given user of the system is allowed to access a private key related thereto however the given user is not allowed to access a private associated with any other user of the system. The key-store database stores the private key related to the plurality of users of the system by enlisting the private keys corresponding to a user identifier of the existing user. The server arrangement identifies the private key related to the existing user by way of obtaining the user identifier from the existing user.

The private key associated with the existing user has to be verified with corresponding public key stored at the given remote digital platform server. The server arrangement communicates with the given remote digital platform server and retrieves the public key stored therewith. Furthermore, the server arrangement verifies the private key associated with the existing user with the public key stored at the given remote digital platform server. Beneficially, verifying the private key associated with the existing user with public key stored at the given remote digital platform server ensures authentication of both the communicating parties (namely, the user-device and the given remote digital platform server).

Moreover, the server arrangement enables the data communication network between the given remote digital platform server and the user device. Notably, the server arrangement allows the user device to communicate with the given remote digital platform server via the data communication network enabled thereby. The server arrangement keeps the data communication functioning for an active session of the existing user, wherein active session relates to an ongoing functioning of the existing user over the data communication network. The data communication network between the user device and the given remote digital platform server relates to a communication channel therebetween that is used to access the remote digital platform and transfer data therebetween. Beneficially, the system provides the existing user with a single gateway to access the plurality of remote digital platforms. Therefore, the existing user does not need to connect with multiple gateways to communicate with remote digital platforms of different networks.

Optionally, the system disables the data communication network after a predefined time period for which the existing user remain inactive over the data communication network.

Optionally, the data communication network established by the system is a virtual private network (VPN). Furthermore, the virtual private network (VPN) extends a private network across a public network, and enables the existing user to send and receive data across shared or public networks as if the user device is directly connected to the private network.

Optionally, the server arrangement enables simultaneous data communication network between the user device and one or more remote digital platforms. In an instance, the existing user generates more than one user-request to access more than one remote digital platform. In such an instance, the server arrangement enables separate channels in the data communication network to enable communication between the user-device and one or more remote digital platforms. Beneficially, providing simultaneous access to one or more remote digital platforms allows the existing user to access multiple remote digital platforms within a small period of time. Therefore, the existing user spends less time in accessing multiple remote digital platforms.

Optionally, the system further includes a log database having entry for data communication between the user-device and each of the plurality of remote digital platforms. The log database includes an entry for each active session of the existing user. In an instance, the log database includes multiple entries for the existing user if the existing user is accessing multiple remote digital platforms. An entry of the given remote digital platform is removed from the log database after the existing user terminates an active session related thereto.

Optionally, the server arrangement further accesses the log database to determine the active session for the existing user. The system does not require credential and authentication of the existing user having an entry in the log database. The server arrangement accesses the log database to determine if the existing user requires to provide credentials and authentication. Alternatively, when an entry for active session associated with the existing user is found in the log database, the user authentication is not performed instead credentials for the given remote digital platform are verified by the server arrangement and after checking plurality of platform databases, access-control database and verifying private key and public key, the data communication network between the given remote digital platform server and the user device is enabled.

In an implementation example, an existing user associated with a user device such as a laptop generates a user-request having a given remote digital platform identifier (namely, an access request) to access a given remote digital platform. The server arrangement analyses the user-request and identifies a given remote digital platform server associated with the given remote digital platform identifier using the plurality of platform databases. Furthermore, the server arrangement checks the log database to determine if the existing user has any active session associated therewith. In an instance, the existing user does not have an entry in the log database. In such an instance, the server arrangement obtains credentials from the existing user via the user device and verifies the credentials in order to authenticate the existing user. Subsequently, the server arrangement, determines roles and permissions associated with the existing user by accessing the access-control database. The server arrangement determines that the existing user is a standard user and therefore the access request is eligible for execution by the system. Furthermore, the server arrangement, retrieves a private key associated with the given digital platform server by accessing the key-store database and verifies the private key associated with the existing user with a public key stored at the given remote digital platform server. The server arrangement, after verifying both communicating parties namely, the user device and the given remote digital platform server, enables a data communication network between the given remote digital platform server and the user device. Consequently, the existing user is enabled to communicate with the given remote digital platform. Moreover, the existing user generates another user-request having a remote digital platform identifier, for file transfer using the user device, laptop. The server arrangement identifies a given remote digital platform server associated with the remote digital platform identifier using the plurality of platform databases. Subsequently, the server arrangement accesses the log database to determine if the existing user has any active session associated therewith. The server arrangement finds an active session associated with the existing user and grants the existing user permission to perform file transfer with the remote digital platform.

The present disclosure also relates to the method as described above. Various embodiments and variants disclosed above apply mutatis mutandis to the method Optionally, in the method, roles associated with the existing user is any one of: an administrator, a standard user, a privileged user.

Optionally, in the method, the user-request is: an access request, a file transfer request.

Optionally, the method further includes a log database having entry for data communication between the user-device and each of the plurality of remote digital platforms.

Optionally, the method further includes verifying credentials provided by the existing user using two factor authentication.

Optionally, the method further includes accessing the log database to determine an active session for the existing user.

Optionally, the method further includes enabling simultaneous data communication network between the user device and one or more of remote digital platforms.

Optionally, the method further includes allowing the administrator for: adding users to the system, providing permissions to the users, deleting users from the system, adding remote digital platforms to the system, adding remote digital platform server to the system, deleting remote digital platform server from the system.

DETAILED DESCRIPTION OF THE DRAWINGS

Referring to FIG. 1, illustrated is a schematic diagram of a system 100 for managing access to a plurality of remote digital platforms, in accordance with an embodiment of the present disclosure. The system for managing access to a plurality of remote digital platforms 102, 104 and 106, wherein the system 100 comprises a plurality of platform databases 108, 110 and 112 wherein a given platform database 108 in the plurality of platform databases 108, 110 and 112 is associated with a given remote digital platform 102 and stores metadata related thereto. The system further comprises a user device 114, wherein an existing user "U" associated with the user device 114 generates a user request for accessing a given remote digital platform 104, and provides a remote digital platform identifier for the given remote digital platform 104. Moreover, the system further comprises an access-control database 116 comprising information relating to roles and permissions associated with a plurality of users (not shown). Furthermore, the system comprises a key-store database 118 comprising private key associated with the plurality of users. The system further comprises a server arrangement 120, wherein the server arrangement identifies a given remote digital platform server 122 associated with the remote digital platform identifier using the plurality of platform databases 108, 110 and 112, wherein remote digital platform servers 122, 124 and 126 are associated with the remote digital platforms 102, 104 and 106 respectively. Subsequently, the server arrangement 120 obtains credentials from the existing user "U" via the user device 114 and verifies the credentials. Moreover, the server arrangement 120 determines roles and permissions associated with the existing user "U" by accessing the access-control database 116. Furthermore, the server arrangement 120 retrieves a private key associated with the given digital platform server 122 by accessing the key-store database 118. The server arrangement 120 verifies the private key associated with the existing user "U" with a public key stored at the given remote digital platform server 122. Subsequently, the server arrangement 120 enables a data communication network 128 between the given remote digital platform server 122 and the user device 114.

FIG. 1 is merely an example, which should not unduly limit the scope of the claims herein. It is to be understood that the simplified illustration of the system 100 for managing access to a plurality of remote digital platforms is provided as an example and is not to be construed as limiting the system 100 to specific numbers, types, or arrangements of the processing arrangement. A person skilled in the art will recognize many variations, alternatives, and modifications of embodiments of the present disclosure.

Figure 2A:
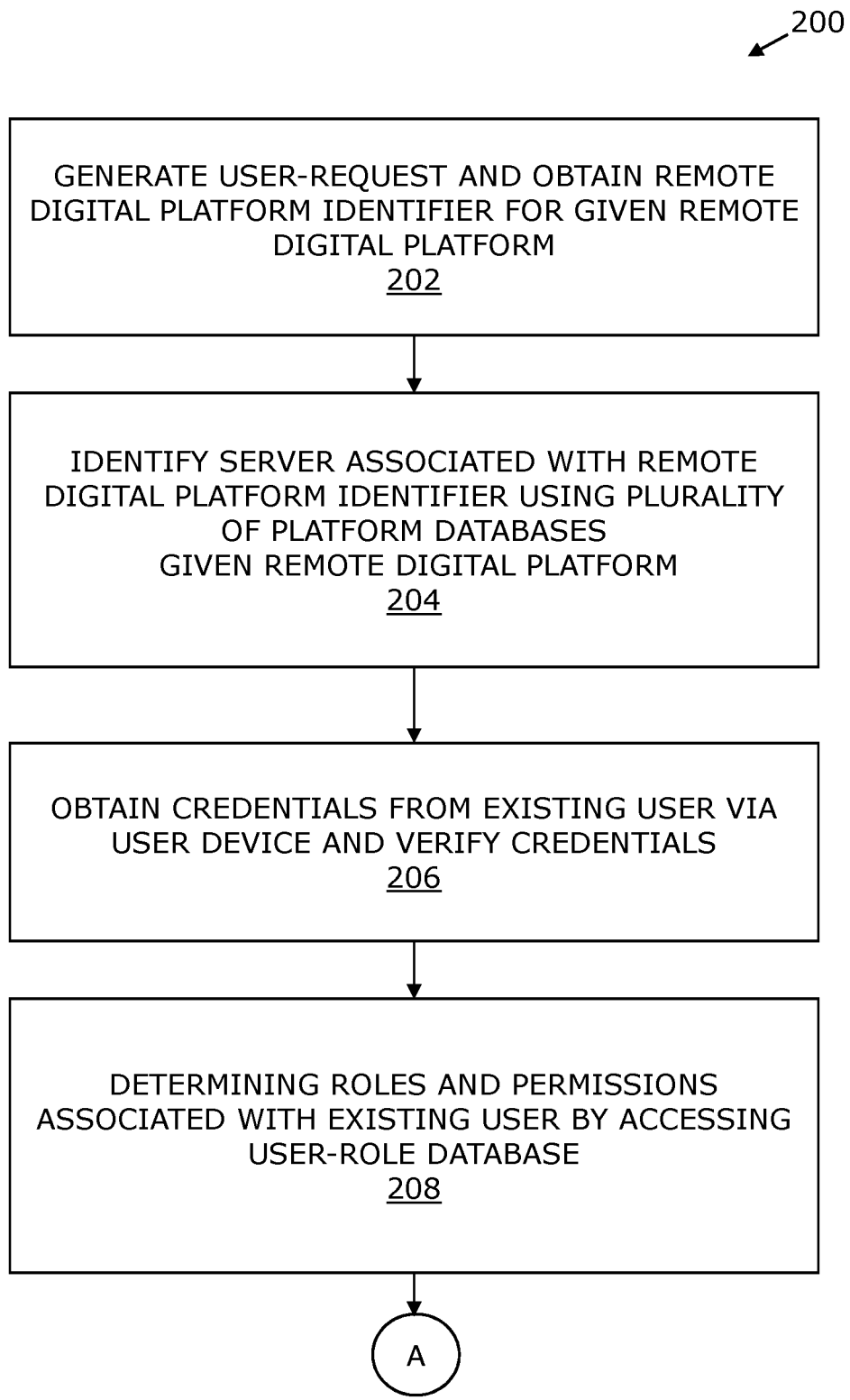
FIG. 2A-B illustrates steps of a method of managing access to a plurality of remote digital platforms, in accordance with an embodiment of the present disclosure.
Figure 2B:
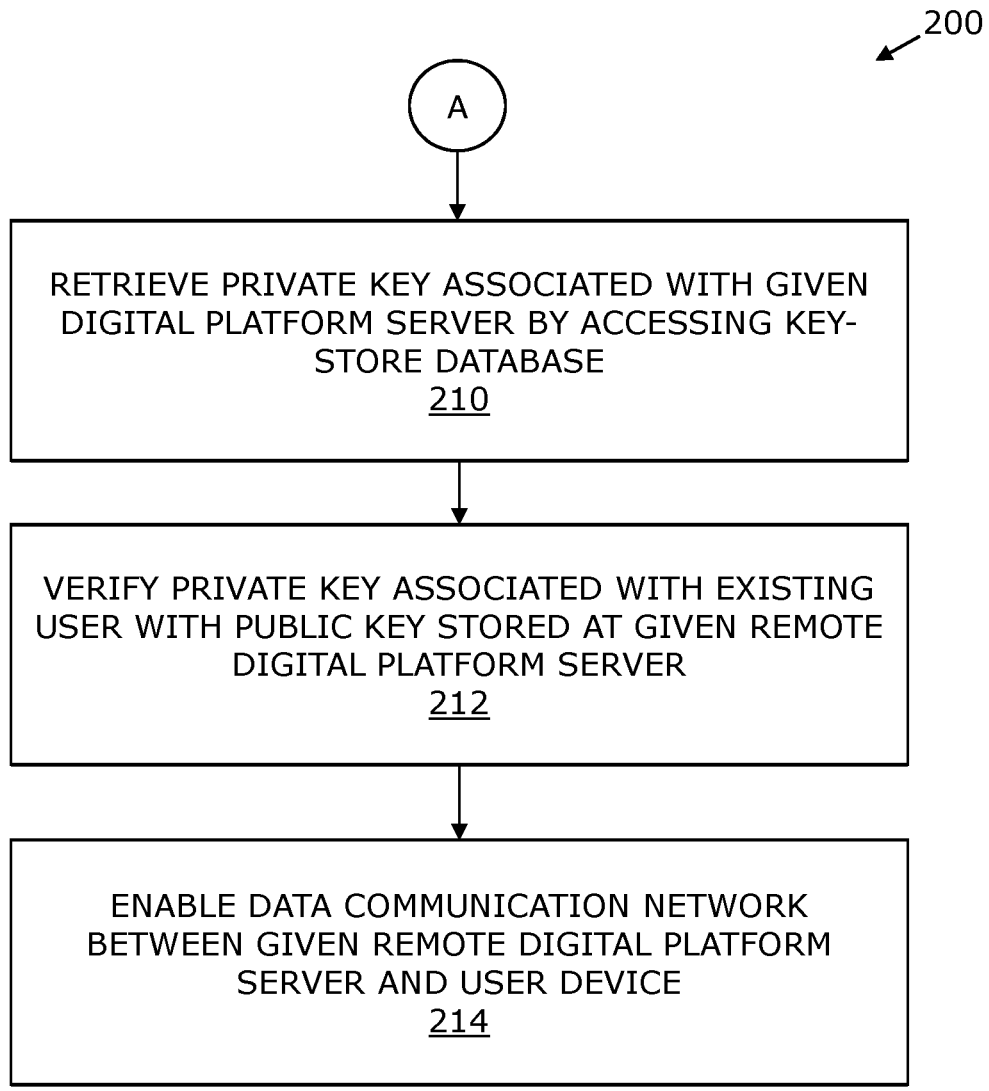

Referring to FIG. 2A-B, illustrated are steps of a method 200 of managing access to a plurality of remote digital platforms, using a system comprising a plurality of platform databases, wherein a given platform database in the plurality of platform databases is associated with a given remote digital platform and stores metadata related thereto. At step 202, a user-request is generated for accessing a given remote digital platform via a user-device associated with an existing user and obtains a remote digital platform identifier for the given remote digital platform via the user-device associated with the existing user. At step 204, a given remote digital platform server associated with the remote digital platform identifier is identified using the plurality of platform databases. At step 206, credentials from the existing user are obtained via the user device and subsequently the credentials are verified. At step 208, roles and permissions associated with the existing user are determined by accessing an access-control database. At step 210, a private key associated with the given digital platform server is retrieved by accessing a key-store database. At step 212, the private key associated with the existing user is verified with a public key stored at the given remote digital platform server. At step 214, a data communication network is enabled between the given remote digital platform server and the user device.

The steps 202, 204, 206, 208, 210, 212 and 214 are only illustrative and other alternatives can also be provided where one or more steps are added, one or more steps are removed, or one or more steps are provided in a different sequence without departing from the scope of the claims herein.

Figure 3:
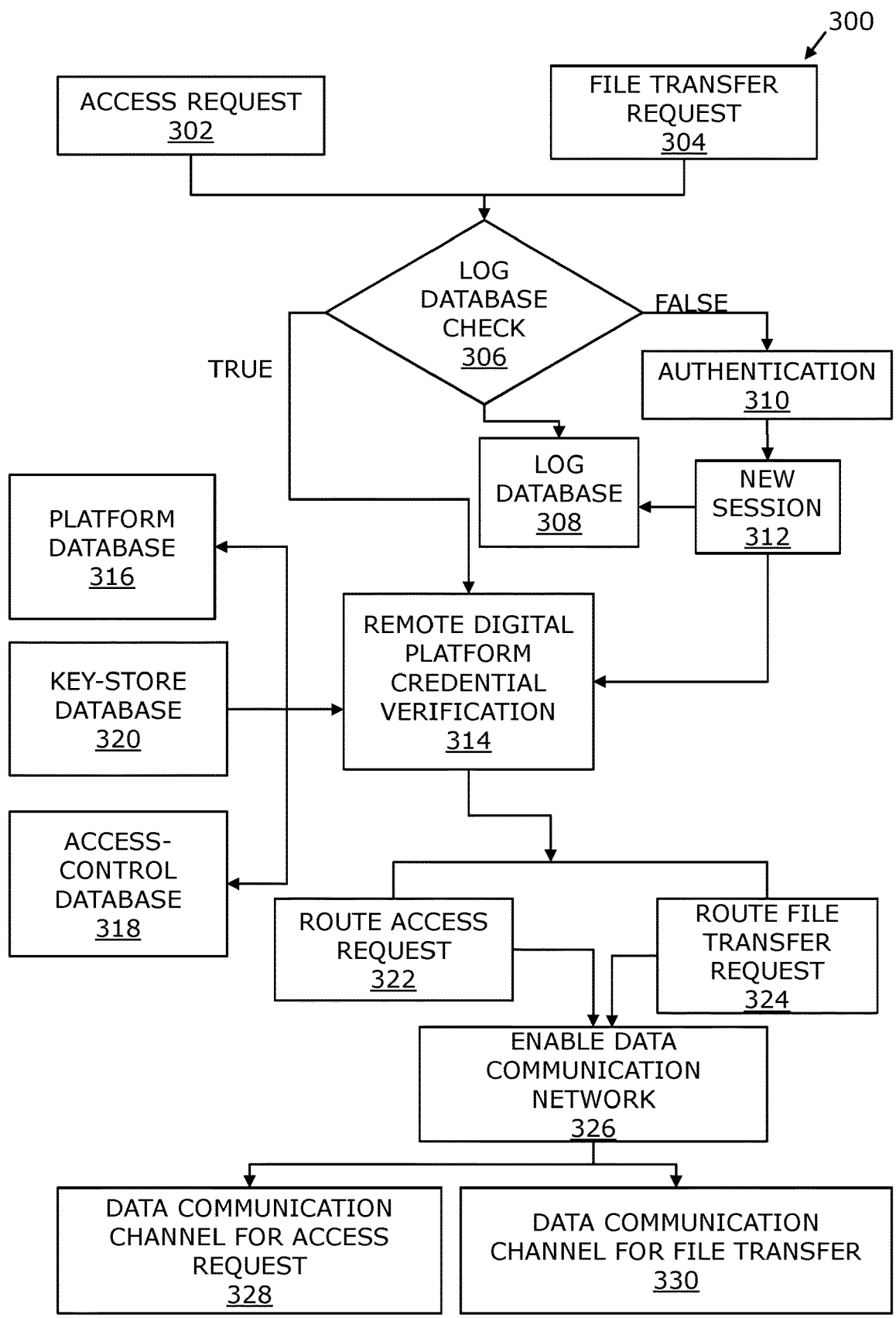
FIG. 3 illustrates a flowchart of steps followed by a server arrangement of FIG. 1, in accordance with an embodiment of the present disclosure.

Referring to FIG. 3, illustrated is a flowchart 300 of steps followed by a server arrangement of FIG. 1, in accordance with an embodiment of the present disclosure. At step 302, an existing user generates a user-request that is an access request. Alternatively, at step 304, the existing user generates a user request that is a file transfer request. At step 306, the server arrangement checks a log database 308 to find an entry for an active session associated with the existing user. In an instance, an entry for active session associated with the existing user is not found in the log database, an authentication of the existing user is performed at a step 310. Subsequently, at step 312 a new entry for a new session is added to the log database. Alternatively, in another instance, when an entry for active session associated with the existing user is found in the log database, credential verification for remote digital platform is performed at a step 314. Moreover, at step 316, platform databases are checked by the server arrangement. At step 318, access-control database is checked to determine roles and permissions associated with the existing user. At step 320, key-store database is accesses to retrieve and verify private key associated with the existing user with public key stored at a given remote digital platform server. Moreover, at step 322, the server arrangement routes a communication channel for access request. At step 324, the server arrangement routes a communication channel for file transfer request. Furthermore, at step 326 the server arrangement enables data communication network, wherein at step 328, the server arrangement enables separate data communication channel for access request and at step 330 the server arrangement enables separate data communication channel for file transfer request.

Figure 4:
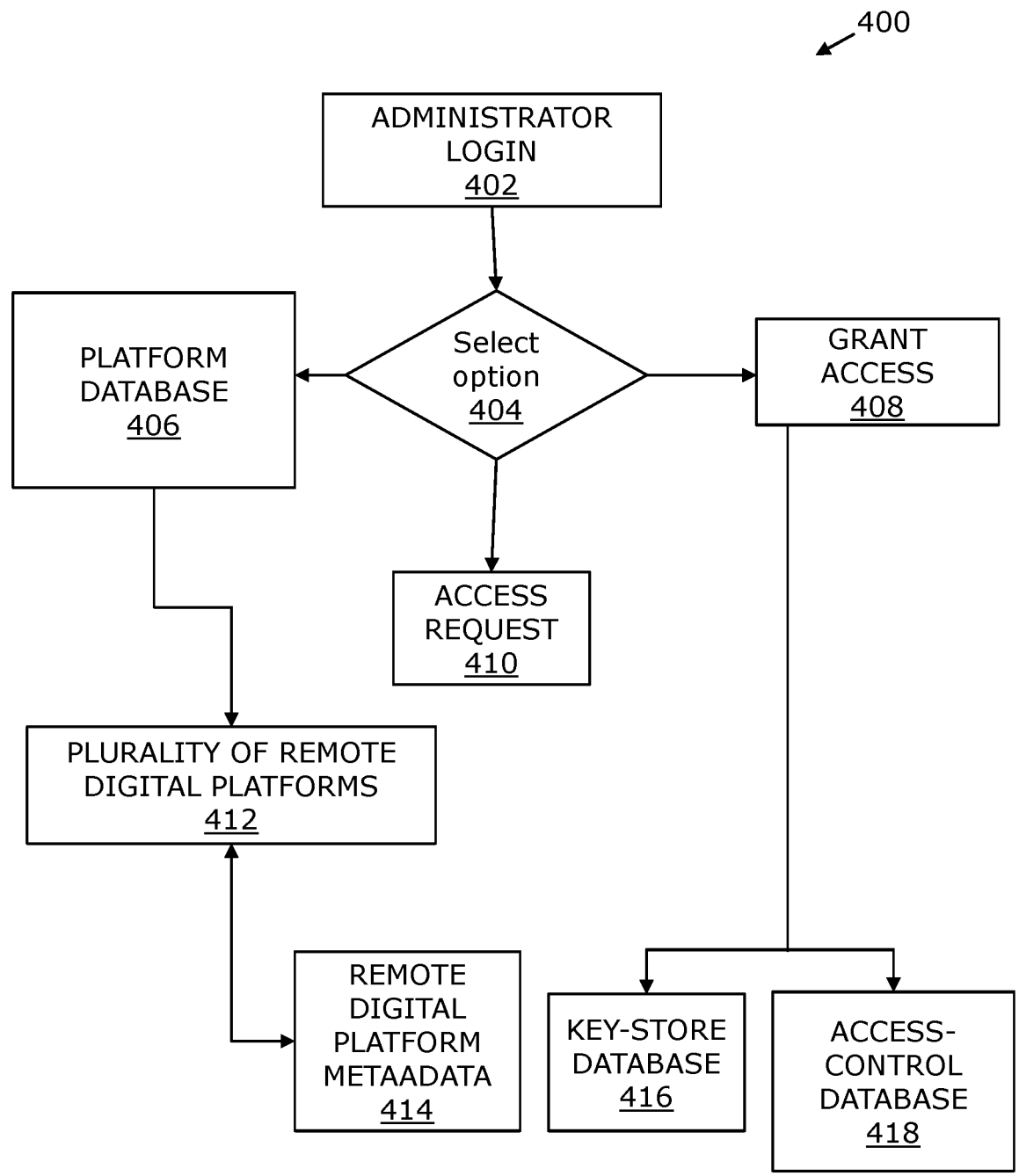
FIG. 4 illustrates a flowchart of steps followed by an administrator, in accordance with an embodiment of the present disclosure.

Referring to FIG. 4, illustrated is a flowchart 400 of step followed by an administrator, in accordance with an embodiment of the present disclosure. At step 402, the administrator login is performed by the administrator. At step 404, the administrator selects an option for further operations to be performed. At step 406, the administrator selects option: platform database and communicates with plurality of remote digital platforms to obtain remote digital platform metadata. At step 410, the administrator selects options: access request and proceeds as a standard server to access remote digital platforms. At step 408, the server grants access to users. At step 416, the administrator updates the key-store database after granting roles and permission to users. At step 418, the administrator updates access-control database after granting roles and permissions to the users.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for managing access to a plurality of remote digital platforms, wherein the system comprising a plurality of platform databases, wherein a given platform database in the plurality of platform databases is associated with a given remote digital platform and stores metadata related thereto, the system further comprising:
a user device, wherein an existing user associated with the user device generates a user-request for accessing a given remote digital platform, and provides a remote digital platform identifier for the given remote digital platform;
an access-control database comprising information relating to roles and permissions associated with a plurality of users, wherein the roles associated with the plurality of users is any one of: an administrator, a standard user, a privileged user, and wherein the privileged user possesses the permissions of the standard user along with the access to the given digital platform in an instance of conflict;
a key-store database comprising private key associated with the plurality of users; and a server arrangement, wherein the server arrangement:
identifies a given remote digital platform server associated with the remote digital platform identifier using the plurality of platform databases;
obtains credentials from the existing user via the user device and verifies the credentials;
determines roles and permissions associated with the existing user by accessing the access-control database;
retrieves a private key associated with the given digital platform server by accessing the key-store database;
verifies the private key associated with the existing user with a public key stored at the given remote digital platform server; and
enables a data communication network between the given remote digital platform server and the user device,
provides a plurality of entries in a log database for each session between the user device and each of the plurality of remote digital platforms,
removes a selected entry when a selected session between the user device and a selected remote digital platform session ends, wherein the data communication network keeps functioning for an active session of the existing user, wherein the active session is an ongoing function of the existing user over the data communication network and the data communication network is disabled and removed from database after a predefined time period for which the existing user remain
inactive over the data communication network,
prevent reauthenticating for a first user with a session in the log database,
require authentication for a second user without a session in the log database,
wherein the system applies an asymmetric encryption for establishing the data communication between the user device and the remote digital platform server,
and wherein the system provides a single gateway to access the plurality of remote digital platforms.

2. The system of claim 1, wherein the user-request is: an access request, a file transfer request.

3. The system of claim 1, wherein the system further includes a log database having entry for data communication between the user-device and each of the plurality of remote digital platforms.

4. The system of claim 1, wherein the server arrangement verifies the credentials provided by the existing user using two factor authentication.

5. The system of claim 1, wherein the server arrangement further accesses the log database to determine the active session for the existing user.

6. The system of claim 1, wherein the server arrangement enables simultaneous data communication network between the user device and one or more remote digital platforms.

7. The system of claim 1, wherein the administrator: adds users to the system, provides permissions to the users, delete users from the system, adds remote digital platforms to the system,
adds remote digital platform server to the system, delete remote digital platform server from the system.

8. A method of managing access to a plurality of remote digital platforms, using a system comprising a plurality of platform databases, wherein a given platform database in the plurality of platform databases is associated with a given remote digital platform and stores metadata related thereto, wherein the method comprises:
generating a user-request for accessing a given remote digital platform via a user-device associated with an existing user, and obtaining a remote digital platform identifier for the given remote digital platform via the user-device associated with the existing user;
identifying a given remote digital platform server associated with the remote digital platform identifier using the plurality of platform databases;
obtaining credentials from the existing user via the user device and verifying the credentials;
determining roles and permissions associated with the existing user by accessing an access-control database, wherein the roles associated with the existing user is any one of: an administrator, a standard user, a privileged user, and wherein the privileged user possesses the permissions of the standard user along with the access to the given digital platform in an instance of conflict;
retrieving a private key associated with the given digital platform server by accessing a key-store database;
verifying the private key associated with the existing user with a public key stored at the given remote digital platform server; and
enabling a data communication network between the given remote digital platform server and the user device, providing a plurality of entries in a log database for each session between the user device and each of the plurality of remote digital platforms, removing a selected entry when a selected session between the user device and a selected remote digital platform session ends, wherein the data communication network keeps functioning for an active session of the existing user, wherein the active session is an ongoing function of the existing user over the data communication network and the data communication network is disabled and removed from database after a predefined time period for which the existing user remain inactive over the data communication network,
preventing reauthenticating for a first user with a session in the loci database, requiring authentication for a second user without a session in the log database,
wherein an asymmetric encryption is used for establishing the data communication between the user device and the remote digital platform server,
and wherein the system provides a single gateway to access the plurality of remote digital platforms.

9. The method of claim 8, wherein the user-request is: an access request, a file transfer request.

10. The method of claim 8, wherein the method further includes a log database having entry for data communication between the user-device and each of the plurality of remote digital platforms.

11. The method of claim 8, wherein the method further includes verifying credentials provided by the existing user using two factor authentication.

12. The method of claim 8, wherein the method further includes accessing the log database to determine the active session for the existing user.

13. The method of claim 8, wherein the method further includes enabling simultaneous data communication network between the user device and one or more remote digital platforms.

14. The method of claim 8, wherein the method further includes allowing the administrator for: adding users to the system, providing permissions to the users, deleting users from the system, adding remote digital platforms to the system, adding remote digital platform server to the system, deleting remote digital platform server from the system.

* * * * *